(12) United States Patent
Damsgaard et al.

(10) Patent No.: US 12,405,782 B2
(45) Date of Patent: Sep. 2, 2025

(54) AUTOMATIC OVER-THE-AIR FIRMWARE UPDATE OF WIRELESS AUDIO PLAYBACK DEVICES

(71) Applicant: Bang & Olufsen A/S, Struer (DK)

(72) Inventors: Morten Damsgaard, Charlottenlund (DK); Christian Birk, Copenhagen (DK)

(73) Assignee: Bang & Olufsen A/S, Struer (DK)

( * ) Notice: Subject to any disclaimer, the term of this patent is extended or adjusted under 35 U.S.C. 154(b) by 186 days.

(21) Appl. No.: 18/279,648

(22) PCT Filed: Jan. 28, 2022

(86) PCT No.: PCT/EP2022/052017
§ 371 (c)(1),
(2) Date: Aug. 31, 2023

(87) PCT Pub. No.: WO2022/189064
PCT Pub. Date: Sep. 15, 2022

(65) Prior Publication Data
US 2024/0168749 A1 May 23, 2024

(30) Foreign Application Priority Data
Mar. 8, 2021 (DK) .............................. PA202100239

(51) Int. Cl.
*G06F 8/65* (2018.01)
(52) U.S. Cl.
CPC ..................... *G06F 8/65* (2013.01)
(58) Field of Classification Search
CPC ........................................................ G06F 8/65
See application file for complete search history.

(56) References Cited

U.S. PATENT DOCUMENTS

| 10,140,110 B2 * | 11/2018 | Vangelov .................. G06F 8/65 |
| 10,235,154 B2 * | 3/2019 | Vangelov .................. G06F 8/65 |

(Continued)

FOREIGN PATENT DOCUMENTS

| CN | 106681774 A | * | 5/2017 | ............... G06F 8/71 |
| CN | 112199102 A | * | 1/2021 | |

(Continued)

OTHER PUBLICATIONS

Bluetooth Low Energy—Wikipedia, Mar. 2, 2021; https://en.wikipedia.org/w/index.php?title=Bluetooth_Low-Energy&oldid=1009900953; pp. 1-3, 5-8; in particular section "Advertising and discovery".

*Primary Examiner* — Daxin Wu
(74) *Attorney, Agent, or Firm* — Harness, Dickey & Pierce, P.L.C.; Anthony G. Fussner (57) ABSTRACT

The present disclosure relates to a method, system and computer program product for updating a firmware (161) of a wireless audio playback device (10). The method comprises controlling (S2) said wireless audio playback device (10) to, in a sleep state, automatically enter a temporary broadcasting mode and conveying (S3), in the temporary broadcasting mode, firmware version information to an external device (20) using a first communication protocol (P1). The method further comprises transmitting (S5) the firmware version information to a remote device (30) over a second communication protocol (P2) and receiving (S6) update data from the remote device (30) over said second communication protocol (P2) by the by the external device (20). The method also comprises conveying, by the external device (20), the update data to the wireless audio playback device (10) and updating (S8) the firmware of the wireless audio playback device (10) using the update data.

16 Claims, 6 Drawing Sheets

(56) References Cited

U.S. PATENT DOCUMENTS

| | | | | |
|---|---|---|---|---|
| 10,631,090 B1* | 4/2020 | Elliot | .................... | H04R 29/007 |
| 11,080,040 B1* | 8/2021 | Devaraj | .................. | H04L 67/34 |
| 11,308,947 B2* | 4/2022 | Bromand | ................ | G06F 3/165 |
| 2008/0243862 A1* | 10/2008 | Pathak | ....................... | G06F 8/60 |
| 2018/0024828 A1* | 1/2018 | Nogueira-Nine | ....... | H04L 67/34 |
| | | | | 717/173 |
| 2018/0074811 A1* | 3/2018 | Kiyama | .................. | H04L 67/12 |
| 2018/0124544 A1* | 5/2018 | Gupta | .................... | H04L 41/082 |
| 2020/0103951 A1* | 4/2020 | Gossain | ................ | G06F 1/3206 |
| 2022/0030519 A1* | 1/2022 | Zhou | ..................... | H04W 4/021 |
| 2022/0171609 A1* | 6/2022 | Karlgaard | ............. | G06F 1/3287 |

FOREIGN PATENT DOCUMENTS

| | | | | |
|---|---|---|---|---|
| CN | 112514354 B | * | 10/2021 | ............. H04L 67/52 |
| EP | 2369474 A1 | * | 9/2011 | ............... G06F 8/66 |
| JP | 2021106559 A | * | 7/2021 | |
| KR | 20070051523 A | * | 11/2005 | |
| WO | WO-2019070235 A1 | * | 4/2019 | ............. G01S 19/45 |

* cited by examiner

AUTOMATIC OVER-THE-AIR FIRMWARE UPDATE OF WIRELESS AUDIO PLAYBACK DEVICES

This patent application is a U.S. national stage filing under 35 U.S.C. § 371 of PCT International Application No. PCT/EP2022/052017 filed Jan. 28, 2022 (published as WO2022/189064 on Sep. 15, 2022), which claims priority to and the benefit of Denmark Application No. PA202100239 filed Mar. 8, 2021. The entire contents of these applications are incorporated herein by reference.

TECHNICAL FIELD OF THE INVENTION

The present invention relates to a method for updating the firmware of a wireless audio playback device and an update system employing the aforementioned method.

BACKGROUND OF THE INVENTION

Wireless audio playback devices such as wireless headphones, wireless earphones or wireless speakers frequently employ short range wireless communication protocols, such as Bluetooth, to communicate with a user device. The user device (e.g. a smartphone or tablet) is used to control the operation of the wireless audio playback device, e.g. the user device streams audio content for playback to the wireless audio playback device wherein the audio content is stored on the user device or accessed from a remote device by the user device. Similarly, the wireless audio playback device may be used to control the operation of the user device or transmit audio picked up by a microphone of the wireless audio playback device to the user device. In one such example the wireless audio playback device is a set of wireless headphones wherein the user may issue a voice command or press a button on the wireless headphones to e.g. pause audio content playback or answer an incoming voice call.

Furthermore, the user device may comprise proprietary software (e.g. an app installed by the user) for performing more advanced configuration or firmware updates of a connected wireless audio playback device. In some examples, the user downloads and installs an app on his/her smartphone which is connected using an active Bluetooth connection to the wireless audio playback device so that the user, using the app, e.g. can configure the equalization or active noise cancellation of the wireless audio playback device or update a firmware of the wireless audio playback device. Accordingly, the proprietary software of the user device may request update data from a remote device which is conveyed to the user device using e.g. a Wi-Fi or mobile network. The user device stores the update data and performs an update of the wireless audio playback device over the active Bluetooth connection.

A problem with the above solutions for updating the firmware of wireless audio playback devices is that the user often must install proprietary software on his/her user device in addition to performing a pairing procedure between the user device and the wireless audio playback device. Accordingly, many users will simply not install the proprietary software on their user device meaning that the connected wireless audio playback device cannot be updated or subjected to other advanced configurations requiring the proprietary software. Additionally, even if a user installs the proprietary software the user must establish the right conditions for the update to occur, including turning on the wireless audio playback device, connecting the wireless audio playback device to the user device, launching the proprietary application when the user device has network access to the remote device, initializing the update procedure and waiting for the update to complete. If the user has many different types of wireless audio playback devices the user may have to perform the same procedure for each wireless audio playback device, potentially using different proprietary software for each type of wireless audio playback device.

To circumvent the above problems with a labor-intensive procedure for updating connected wireless audio playback devices some solutions have been presented wherein the proprietary software runs in the background of the user device. When the wireless audio playback device is connected to the user device the proprietary software runs in the background and obtains update data which is used to update the wireless audio playback device. However, in many situations the wireless audio playback device cannot be used for playback during the updating procedure and/or the wireless audio playback device must reboot to perform the update. Accordingly, firmware update processes running in the background of the user device may interfere with the usability of the wireless audio playback device or the right conditions for performing the update in the background without interfering with the usability (e.g. the wireless audio playback device being connected to the user device but not playing back or recording audio content) may only occur infrequently. For instance, updating may only occur when the wireless audio playback device is turned on, wirelessly connected to the user device and not in use for audio playback.

SUMMARY OF THE INVENTION

In view of the drawbacks of existing solutions there is a need for an improved method for updating wireless audio playback devices. It is a purpose of this disclosure to provide such an improved method and a system for performing firmware updates of a wireless audio playback device.

According to a first aspect of the invention there is provided a method for updating a firmware of a wireless audio playback device. The wireless audio playback device comprises a wireless transceiver configured to communicate using a first communication protocol and the wireless audio playback device is operable in a sleep state in which the wireless transceiver is inactive by default. The method comprises controlling the wireless audio playback device to enter the sleep state and controlling the wireless audio playback device to, in the sleep state, automatically enter a temporary broadcasting mode from the sleep state in which at least a transmitter of the wireless transceiver is activated. The method further comprises conveying, with the wireless audio playback device in the temporary broadcasting mode, firmware version information to an external device using the first communication protocol, the firmware version information being indicative of a firmware version of the wireless audio playback device and controlling the wireless audio playback device to automatically enter a temporary listening mode in which at least a receiver of the wireless transceiver is activated.

For the external device, the method further comprises transmitting, by the external device, the firmware version information to a remote device over a second communication protocol different from the first communication protocol, receiving, by the external device, update data from the remote device over the second communication protocol, wherein the remote device has determined the update data based on the firmware version information and wherein the update data comprises instructions for updating the firmware of the wireless audio playback device and transmitting, by the external device, the update data over the first communication protocol.

Further, for the wireless audio playback device the method further comprises receiving, by the wireless audio playback device in the temporary listening mode, the update data over the first communication protocol and updating the firmware of the wireless audio playback device using the update data.

With the sleep state it is meant a state of the wireless audio playback device with reduced power consumption in comparison to an active operation state. The sleep state may be a turned-off state, or a standby state, wherein at least means for time keeping are active to trigger the wireless audio playback device to automatically enter the temporary broadcasting mode and/or temporary listening mode.

With conveying data (e.g. firmware version information) from one entity to another (e.g. from the wireless audio playback device to the external device) it is meant transmitting the data from one of the entities to the other one of the entities.

With a wireless audio playback device it is meant a device capable of receiving audio content indicative of an audio signal over a wireless communication protocol and playback of the audio signal with one or more loudspeaker elements or equivalent. The wireless audio playback device may e.g. be a set of wireless earphones, wireless headphones, wireless earbuds (for personal listening) or a wireless speaker (for listening in proximity to the speaker).

The invention is at least partially based on the understanding that by configuring the wireless audio playback device to automatically enter the temporary broadcasting mode and temporary listening mode, the firmware of the wireless audio playback device will be automatically updated with the aid of the external device without any user interaction. Consequently, the user will use the wireless audio playback device with the latest firmware without having to manually start an updating procedure with a user device. Accordingly, the user device may be used with the wireless audio playback device for merely streaming of audio content (from e.g. a user device) whereas firmware updates are carried out over a separate communication path (via an external device). As most users will not install any required proprietary software on the user device or initiate the update procedure using the proprietary software the present invention will enable wireless audio playback devices to be updated more frequently which enhances the listening experience.

In some implementations, the first communication protocol is a Bluetooth communication protocol and/or the second communication protocol is a Wi-Fi or wired communication protocol. Accordingly, the method may be implemented in a Bluetooth enabled wireless audio playback device and a Bluetooth enabled external device which additionally is capable of communicating with the remote device using Wi-Fi or a wired connection.

The external device may be a wireless speaker. A wireless speaker is commonly provided with communication means for communicating using both a first and second communication protocol whereas the wireless audio playback device is commonly only enabled to communicate using the first communication protocol.

In some implementations, controlling the wireless audio playback device to automatically enter the temporary broadcasting mode comprises at least one of controlling the wireless audio playback device to periodically enter the temporary broadcasting mode and automatically enter the temporary broadcasting mode at a predetermined time of day (e.g. during nighttime such as between 12:00 am and 6:00 am). That is, the wireless audio playback device may periodically attempt to update its firmware which ensures that a latest firmware is installed soon after it is made available, and the wireless audio playback device may initiate the update procedure when the wireless audio playback device is expected to not be used (for audio playback). If the wireless audio playback device is e.g. used for playback when an attempt to update the firmware is made the update procedure may be postponed until a later point in time.

Further, the wireless audio playback device may be controlled to automatically exit the temporary broadcasting mode and temporary listening mode to return to the sleep state, allowing the wireless audio playback device to conserve power. The wireless audio playback device may exit the temporary broadcasting mode and temporary listening mode at a same or two different points in time, wherein the wireless audio playback device enters the sleep state at the point in time occurring the latest.

In some implementations, the wireless audio playback device is operable in an operation state in which the wireless transceiver is active by default and the method further comprises receiving, by the wireless audio playback device in the operation state, audio content transmitted by a user device and rendering the audio content to at least one loudspeaker element of the wireless audio playback device in the operation state. That is, the method may comprise controlling the wireless audio playback device to exit the operation state and enter the sleep state meaning that the audio playback device may be used to playback audio content whereafter the wireless audio playback device is put in the sleep state and updated so as to have the latest firmware installed when the user again uses the wireless audio playback device in the operation state.

In some implementations, the external device is a first external device, and the method further comprises conveying, with the wireless audio playback device in the temporary broadcasting mode, firmware version information to at least one additional external device using the first communication protocol and determining that the first external device is associated with a lower update cost value than the at least one additional external device, wherein the update cost value of each external device is based on the device properties of the external device or the communication properties of the external device.

In general, two or more external devices may receive the firmware version information and negotiate with each other to determine the most suitable external device (i.e. the external device associated with the lowest update cost) for carrying out the updating procedure. As a result, the most suitable external device will perform the update procedure while the at least one additional external device does not take part in the updating procedure.

According to a second aspect of the invention there is provided an updating system comprising a wireless audio playback device and an external device. The wireless audio playback device comprises a wireless transceiver configured to communicate using a first communication protocol and the wireless audio playback device is operable in a sleep state in which the wireless transceiver is inactive by default. The external device is configured to communicate with the wireless audio playback device using a first communication protocol and with a remote device using a different second communication protocol.

The wireless audio playback device further comprises an audio device controller configured to control the wireless audio playback device to enter the sleep state, control the wireless audio playback device to, in the sleep state, automatically enter a temporary broadcasting mode in which at least a transmitter of the wireless transceiver is activated, control the wireless audio playback device to, in the temporary broadcasting mode, convey firmware version information to an external device with the transmitter using the first communication protocol, the firmware version information being indicative of a firmware version of the wireless audio playback device and control the wireless audio playback device to automatically enter a temporary listening mode in which at least a receiver of the wireless transceiver is activated.

The external device further comprises an external device controller configured to control the external device to transmit the firmware version information to a remote device over the second communication protocol, control the external device to receive update data from the remote device over the second communication protocol, wherein the remote device has determined the update data based on the firmware version information and wherein the update data comprises instructions for updating the firmware of the wireless audio playback device, and control the external device to transmit the update data to the wireless audio playback device, wherein the audio device controller is further configured to control the wireless audio playback device to, in the temporary listening mode, receive the update data over the first communication protocol and update the firmware of the wireless audio playback device using the update data.

According to a third aspect of the invention there is provided a computer readable computer program product comprising instructions which, when the program is executed by a computer of an updating system, cause the computer to carry out the method according to the first aspect of the invention. It is understood that the computer may be a distributed computer with at least one processor in each of the wireless audio playback device and the external device.

The invention according to the second and third aspect features the same or equivalent benefits as the invention according to the first aspect. Any functions described in relation to the method, may have corresponding features in a system or device or computer program product.

BRIEF DESCRIPTION OF THE DRAWINGS

These and other aspects of the invention will now be described in more detail, with reference to the appended drawings showing exemplary embodiments of the present invention, wherein.

DETAILED DESCRIPTION OF CURRENTLY PREFERRED EMBODIMENTS

Figure 1:
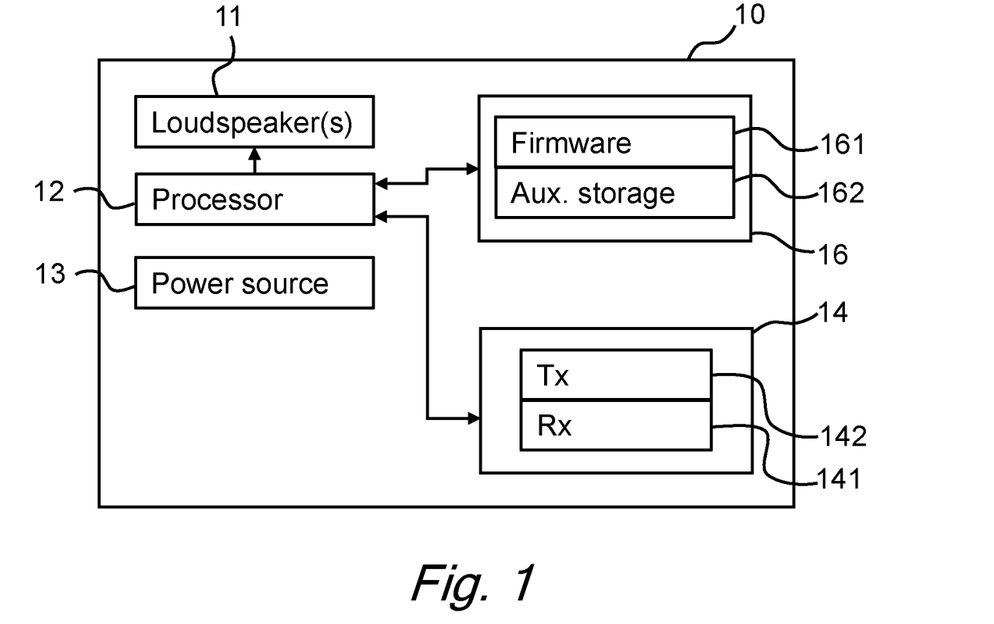
FIG. 1 is a block diagram illustrating a wireless audio playback device according to some implementations.

With reference to FIG. 1 there is illustrated a wireless audio playback device 10 according to embodiments of the present invention. The wireless audio playback device 10 may be a set of wireless earphones, headphones or earbuds or any type of audio device suitable for personal listening. The wireless audio playback device 10 may alternatively be a wireless loudspeaker adapted to emit a sound which is perceived by one or more persons in the environment. The wireless audio playback device 10 may be a portable device meaning that it is small and light enabling a user to carry the wireless audio playback device 10 and use it in different locations.

In some implementations, the wireless audio playback device 10 also comprises one or more microphones (not shown) wherein the wireless audio playback device 10 may act as headset for both audio playback using the one or more loudspeaker elements and audio pick-up using the one or more microphones.

The wireless audio playback device 10 is powered by a power source 13. The power source 13 may comprise a rechargeable battery and/or a replaceable battery and the power source 13 is configured to supply power to components of the wireless audio playback device 10. For instance, a power source 13 comprising a battery enables the user to use the wireless audio playback device 10 at home, outdoors, at the gym or while commuting without access to the utility power grid.

The wireless audio playback device 10 comprises a transceiver unit 14 comprising an RF receiver 141 and an RF transmitter 142 configured to enable wireless communication using a first communication protocol. That is, using the transceiver 14 the wireless audio playback device 10 transmits and receives data to/from an external device over the first communication protocol.

Accordingly, the wireless audio playback device 10 may e.g. receive and transmit audio content using the transceiver 14 over the first communication protocol. For instance, a user device (such as a smartphone, tablet or laptop) may be connected to the wireless audio playback device 10 and transmit audio content to the wireless audio playback device 10 whereby the wireless audio playback device 10 renders the audio content to one or more loudspeaker signals which in turn are fed to one or more loudspeaker elements 11 of the wireless audio playback device 10. Similarly, the wireless audio playback device 10 may transmit data to the user device (e.g. data associated with audio picked up by a microphone of the wireless audio playback device 10) using the first communication protocol. The audio content is indicative of one or more audio signals. For instance, the audio content is associated with a mono audio format, stereo audio format or spatial audio format.

In some implementations, the first communication protocol is a Bluetooth communication protocol wherein the transceiver 14 is a Bluetooth transceiver. The Bluetooth communication protocol may be a Bluetooth-low-energy (BLE) communication protocol with a communication range of approximately 10 to 30 meters (depending on the presence of walls or other obstacles).

The wireless audio playback device 10 further comprises a processor 12 for controlling the operation of the wireless audio playback device 10. That is, the processor 12 is or comprises a controller. For example, the processor 12 also performs audio processing on received audio content wherein the audio processing comprises at least one of: rendering the audio content to one or more loudspeaker feed signals, applying equalization, performing active or passive noise cancellation, and applying one or more filters.

The processor 12 may further control the activation/inactivation and/or operation of the transceiver 14, process data in the data storage unit 16 and/or control the power state of the wireless audio playback device 10 including turning the wireless audio playback device 10 off, putting the wireless audio playback device 10 into a sleep state, putting the wireless audio playback device 10 into a temporary broadcasting mode and/or putting the wireless audio playback device 10 into a temporary listening mode. The processor 12 may be configured to control the wireless audio playback device 10 to automatically enter the sleep state when the wireless audio playback device is not in use. In one implementation, the wireless audio playback device 10 further comprises a proximity sensor or motion sensor (not shown) which communicates with the processor 12 and enables the processor 12 to establish whether the wireless audio playback device 10 is in use or not.

The operation of the processor 12 may be described at least partially by the firmware 161 stored in the data storage unit 16. For instance, the firmware 161 includes data specifying the rendering of the audio content to the loudspeaker element(s) 11, processing of the audio content or rendered loudspeaker signals and/or details of an active or passive noise cancellation to be performed. It is understood that the firmware 161 of the wireless audio playback device 10 may at least partially define any operation of the wireless audio playback device 10 or the components of the wireless audio playback device 10. In many applications it is desirable to make as many operations of the components as possible configurable based on the firmware 161 to enable updating the wireless audio playback device 10 without performing physical servicing of the components, performing replacement of components and/or replacing the wireless audio playback device 10 entirely. A non-exhaustive list of operations which may at least partially be defined by the firmware 161 comprises audio processing algorithms (such as filtering, delay, equalization or reverberation), processing relating to active noise cancelling (ANC) or transparency, processing of the microphone signal(s), user interface (such as detection of touch buttons or other controls of the wireless audio playback device 10), communication over the first communication protocol and settings for any components of the wireless audio playback device 10 such as the amplifiers of the of the loudspeaker element(s), the transceiver 14 and data storage unit 16.

In some implementations, the wireless audio playback device 10 further comprises an auxiliary data storage location 162. The auxiliary data storage location 162 may be provided in a separate data storage unit of the wireless audio playback device 10 or a partition of the data storage unit 16 which also stores the firmware 161. The auxiliary data storage location 162 is e.g. used to temporarily store audio content (i.e. acting as a buffer) and/or storing update data for updating the firmware 161 to a new firmware version.

Figure 2:
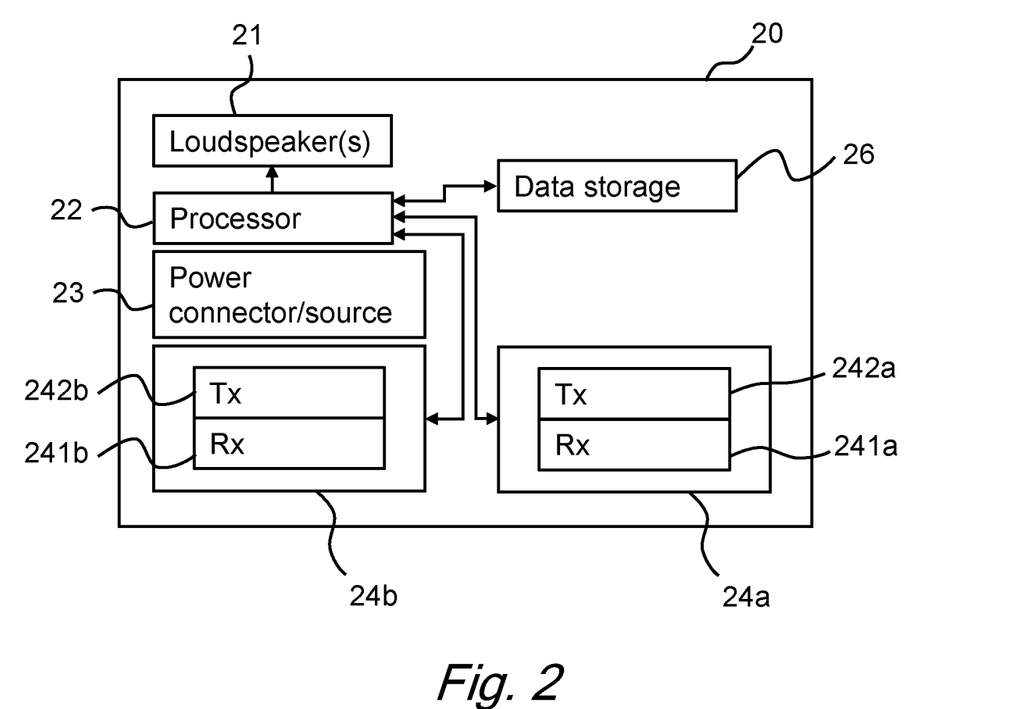
FIG. 2 is a block diagram illustrating an external device according to some implementations.

With further reference to FIG. 2 there is illustrated a block diagram of an external device 20 according to some implementations. The external device 20 may be a smart speaker or wireless speaker comprising at least one loudspeaker element 21 outputting sound to the environment of the external device 20. In contrast to the wireless audio playback device 10 described in the above, the external device 20 may be intended for stationary use. For instance, the external device 20 is a wireless speaker which is powered by connecting a power connector 23 of the external device 20 to the utility power grid. Alternatively or additionally, the external device 20 is powered by a rechargeable or replaceable battery. In some implementations, the external device 20 has a weight exceeding 1 kilogram, 3 kilograms, 5 kilograms, 10 kilograms, 15 kilograms or 18 kilograms. For instance, the external device 20 is a stationary device powered by the utility power grid only and has a weight exceeding 4 kilograms.

The external device 20 may comprise one or more microphones (not shown) used to pick-up sound such as the user's speech.

The external device 20 comprises a processor 22 configured to control the operation (e.g. activating/inactivating) at least one transceiver 24a, 24b of the external device 20 and/or perform audio processing of audio content which is to be rendered to the at least one loudspeaker element 21 or which has been picked up by the one or more microphones.

The external device 20 is configured to communicate using the first communication protocol and using a second communication protocol. In some implementations, the external device 20 comprises a first and second transceiver 24a, 24b for enabling communication using the first and second communication protocol respectively. Alternatively, the first and second communication protocol is supported by a same transceiver 24a which can communicate using both the first and second communication protocol either simultaneously or interchangeably. The first communication protocol is a wireless communication protocol (such as Bluetooth) and the second communication protocol is either a wired or wireless communication protocol such as a communication protocol chosen from a group comprising: wired communication using a wired communication protocol (such as an ethernet protocol), wireless communication using Wi-Fi IEEE 802.11, wireless communication using ZigBee, wireless communication using Z-Wave, wireless communication over a cellular network (such as LTE or 5G).

In some implementations, the second communication protocol is a wireless or wired communication protocol different from the first communication protocol. In one such implementation, the first communication protocol is a Bluetooth communication protocol (such as BLE) and the second communication protocol is a Wi-Fi communication protocol (such as b, g, n, ac or ax type Wi-Fi). The external device 20 may be a stationary wireless speaker, e.g. a Wi-Fi speaker, offering connectivity using both Bluetooth (to e.g. receive audio content from a user device) and Wi-Fi (to e.g. receive audio content streamed from a remote device implementing an online music streaming service).

The processor 22 may further be configured to control the at least one transceiver 24a, 24b to receive firmware version information from the wireless audio playback device 10 and pass this information to a remote device using the second communication protocol. Optionally, the external device 20 comprises a data storage unit 26 for temporarily storing firmware version information from the wireless audio playback device 10 and/or update data intended for the wireless audio playback device 10.

Figure 3:
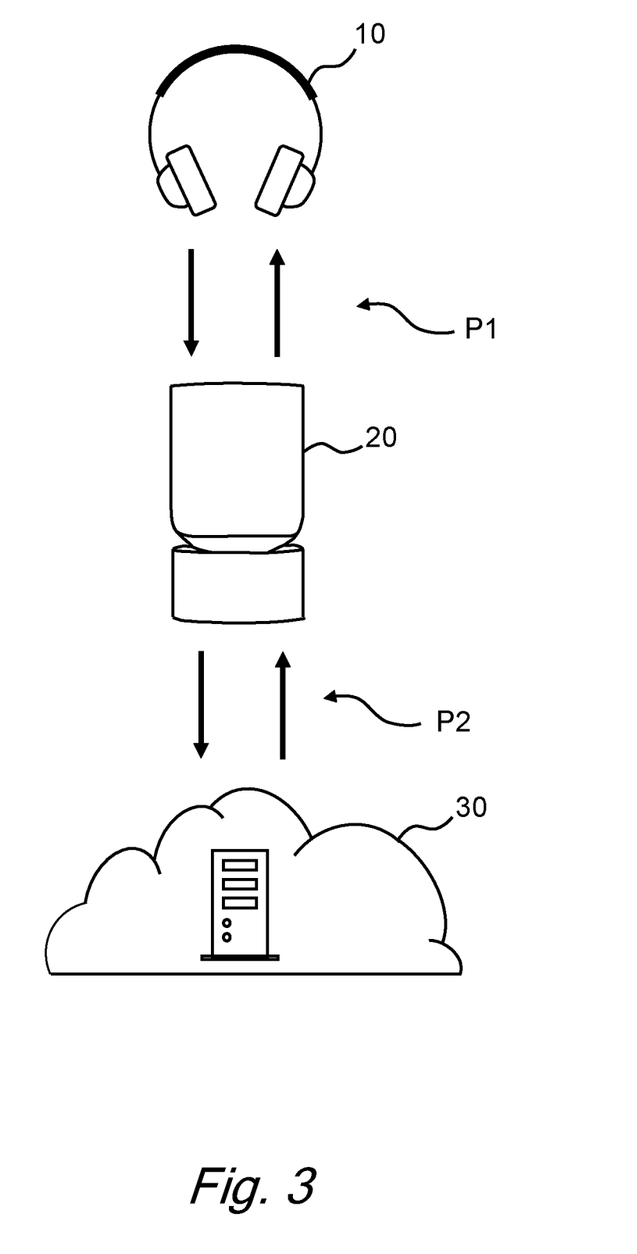
FIG. 3 illustrates the communication between a wireless audio playback device, an external device, and a remote device during a firmware update procedure according to some implementations.

FIG. 3 illustrates the communication between the wireless audio playback device 10 and the external device 20 during the updating procedure. With further reference to FIG. 1, FIG. 2 and the flowchart of FIG. 4 which describes a method of the present invention details of the updating procedure will now be presented.

Figure 4:
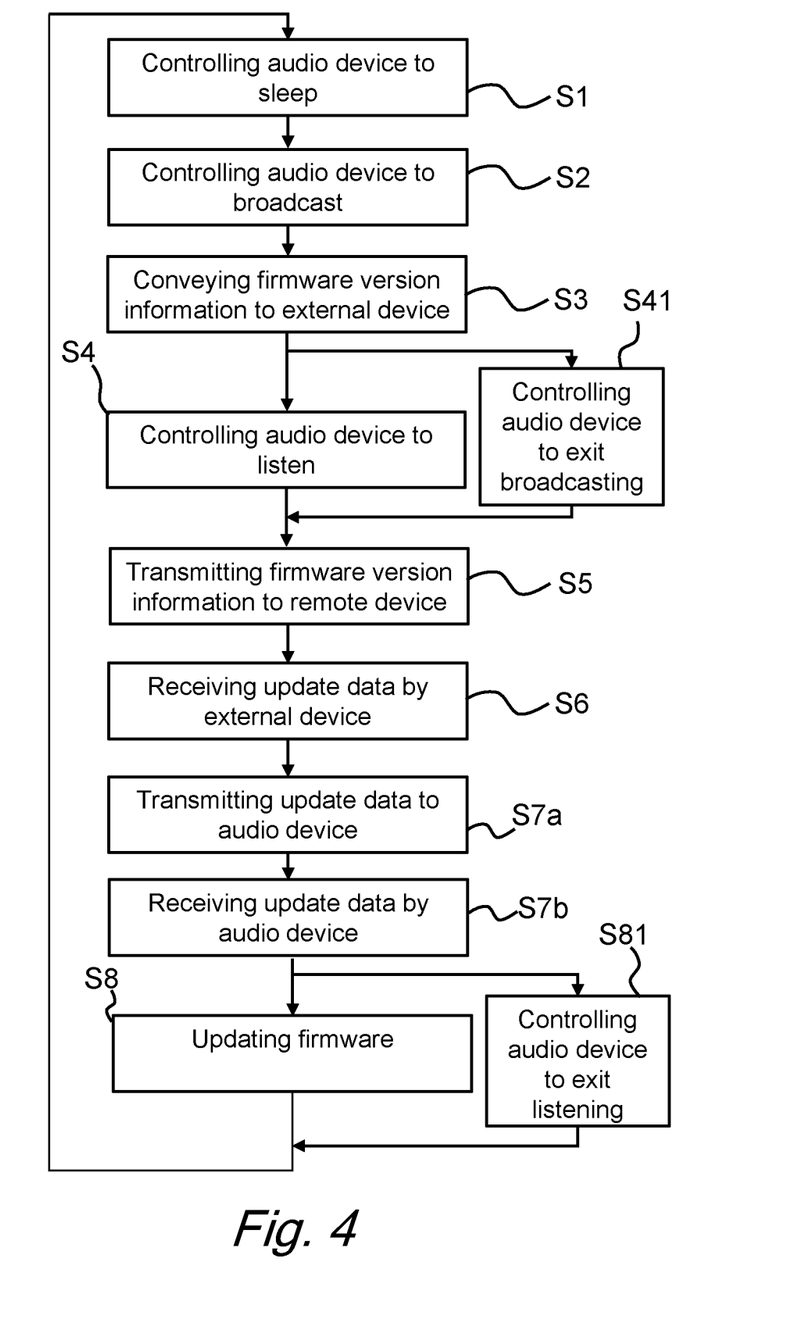
FIG. 4 is a flowchart describing a method according to some implementations of the invention.

At step S1 the wireless audio playback device 10 is controlled to enter the sleep state. For instance, the wireless audio playback device 10 enters the sleep state after the wireless audio playback device 10 has been in the operation state comprising receiving audio content transmitted to the wireless audio playback device 10 from a user device and performing playback of the audio content via a loudspeaker element 11 of the wireless audio playback device 10. In the sleep state at least the transceiver unit 14 of the wireless audio playback device 10 is inactive by default and the processor 12 (and other components) of the wireless audio playback device 10 may enter an idle or turned-off state.

At step S2 the wireless audio playback device 10 is configured to automatically enter the temporary broadcasting mode. For instance, the wireless audio playback device 10 is configured to automatically enter the temporary broadcasting mode after a predetermined period of time has elapsed since the wireless audio playback device 10 entered the sleep state. Alternatively, the wireless audio playback device 10 is configured to automatically enter the temporary broadcasting mode at a predetermined time of day or time of week. For example, the wireless audio playback device 10 is configured to automatically enter the temporary broadcasting mode at nighttime (e.g. between midnight 12:00 am and early morning 6:00 am). In some implementations, the wireless audio playback device 10 is configured to automatically enter the temporary broadcasting mode at a time when the wireless audio playback device 10 is expected to not be in use (which e.g. may be enabled by keeping a record of times when the wireless audio playback device 10 is used).

At step S3 the wireless audio playback device 10 conveys firmware version information to the external device 20 using the first communication protocol P1 (e.g. Bluetooth). To accomplish this, the wireless audio playback device 10 is in the temporary broadcasting mode in which at least the transmitter 142 of the transceiver unit 14 is active. For instance, the firmware version information is broadcasted as a Bluetooth beacon which is received by the external device 20. The firmware version information is indicative of at least one of: a model (or type) of the wireless audio playback device 10 and the version of the current firmware of the wireless audio playback device 10. Optionally, the wireless audio playback device 10 also conveys usage analytics data to the external device 20 and/or further data indicative of e.g. the battery charge level of the wireless audio playback device 10.

At step S4 the wireless audio playback device 10 is controlled to automatically enter a temporary listening mode in which at least a receiver 141 of the wireless audio playback device 10 is active. The temporary listening mode may at least partially overlap in time with the temporary broadcasting mode and/or the temporary listening mode may start after the temporary broadcasting mode has ended.

At step S5 the external device 20 conveys the firmware version information to the remote device 30 over the second communication protocol P2. Alternatively, the external device 20 determines that it is not capable of continuing the update procedure (e.g. the remote device 30 may be unreachable) whereby the external device 20 conveys a notice of no available external device 30 to the wireless audio playback device 10.

Moreover, the external device 20 may be configured to transmit a notice of acknowledgement to the wireless audio playback device 10 as soon as the firmware version information is received.

The remote device 30 may be a remote server or cloud implementation providing firmware update services. The remote device 30 analyzes the firmware version information and determines if a new firmware version is available. If a new firmware version is available, the remote device 30 conveys the update data to the external device 20 over the second communication protocol P2. If no new firmware version is available (e.g. the firmware version information may indicate an installed firmware being the latest firmware) the remote device 30 may convey a notice of no available update to the external device 20 over the second communication protocol P2.

At step S6 the external device 20 receives the update data (or the notice of no available update) from the remote device 30 and at step S7a the external device 20 transmits the update data (or notice of no available update) to the wireless audio playback device 10. At step S7b the wireless audio playback device 10 receives the update data over the first communication protocol P1. In some implementations, the update data is at least temporarily stored in a data storage unit 26 of the external device 20. For instance, the update data is stored until the update data can be conveyed to the wireless audio playback device 10.

To preserve power the wireless audio playback device 10 will only remain in the temporary broadcasting mode and temporary listening mode for a predetermined duration of time. For instance, after the firmware version information has been broadcasted the wireless audio playback device 10 enters the temporary listening mode and remains in the temporary listening mode for less than 10 seconds, such as less than 5 seconds or less than 1 second. If no data is conveyed from an external device 20 to the wireless audio playback device 10 in this time the wireless audio playback device 10 may revert to the sleep state and if data is conveyed from an external device 20 the wireless audio playback device 10 may remain in the temporary listening mode until the data transfer has completed. It is understood that the transfer of the update data from the external device 20 to the wireless audio playback device 10 may take up to 1 minute, or even several minutes or more than 10 minutes depending on the size of the update data. A new update procedure may then be attempted by the wireless audio playback device 10 at a later point in time, e.g. after a predetermined elapsed time (such as 30 minutes or 1 hour) since the first update procedure was attempted.

In some implementations, the method goes to step S41 after the firmware version information is conveyed to the external device 20 at step S3 wherein step S41 involves controlling the wireless audio playback device 10 to automatically exit the temporary broadcasting mode. As the wireless audio playback device 10 may not need to transmit any further information the wireless audio playback device 10 may exit the temporary broadcasting mode immediately after the firmware version information has been broadcasted.

Similarly, the wireless audio playback device 10 is controlled at step S81 to exit the temporary listening mode (and potentially also the temporary broadcasting mode) and return to the sleep state if at least one of the following events occur: (a) a predetermined time has elapsed since the wireless audio playback device 10 entered/exited the temporary broadcasting mode or temporary listening mode, (b) a notice of no available update is received by the wireless audio playback device 10, (c) a notice of no available external device 20 is received by the wireless audio playback device 10, (d) no notice of acknowledgment is received during a predetermined elapsed time since the wireless audio playback device 10 entered/exited the temporary broadcasting mode or temporary listening mode and (e) the update data has been received.

At step S8 the firmware of the wireless audio playback device 10 is updated. The firmware may be updated while the wireless audio playback device 10 is in the temporary broadcasting and/or temporary listening mode or the firmware may be updated when the wireless audio playback device 10 has exited the temporary broadcasting or temporary listening mode but prior to reverting to the sleep state. After step S8 the method repeats with step S1 comprising controlling the wireless audio playback device 10 to enter the sleep state.

Optionally, the wireless audio playback device 10 reboots after the update is completed and/or returns to the sleep state after reboot or completion of the firmware update. Moreover, the firmware update may be aborted if the user starts using the wireless audio playback device 10 whereby the firmware update is resumed when the wireless audio playback device 10 is no longer in use and e.g. returns to the sleep state.

It is understood that the flowchart of FIG. 4 is merely exemplary and that the order of many of the steps may different. For instance, step S4 may occur before step S3, before or at the same time as step S2 or later, such as after step S5 or S6. Additionally, step S41 may occur at any time after S3 and S81 may occur any time after S7b, e.g. step S41 and S81 may occur after step S8. In another example, controlling the wireless audio playback device 10 to enter the sleep state at step S1 may involve one or more of step S41 and S81 meaning that controlling the wireless audio playback device 10 to enter the sleep state may involve controlling the wireless audio playback device 10 to exit at least one of the temporary broadcasting mode and the temporary listening mode.

Figure 5A:
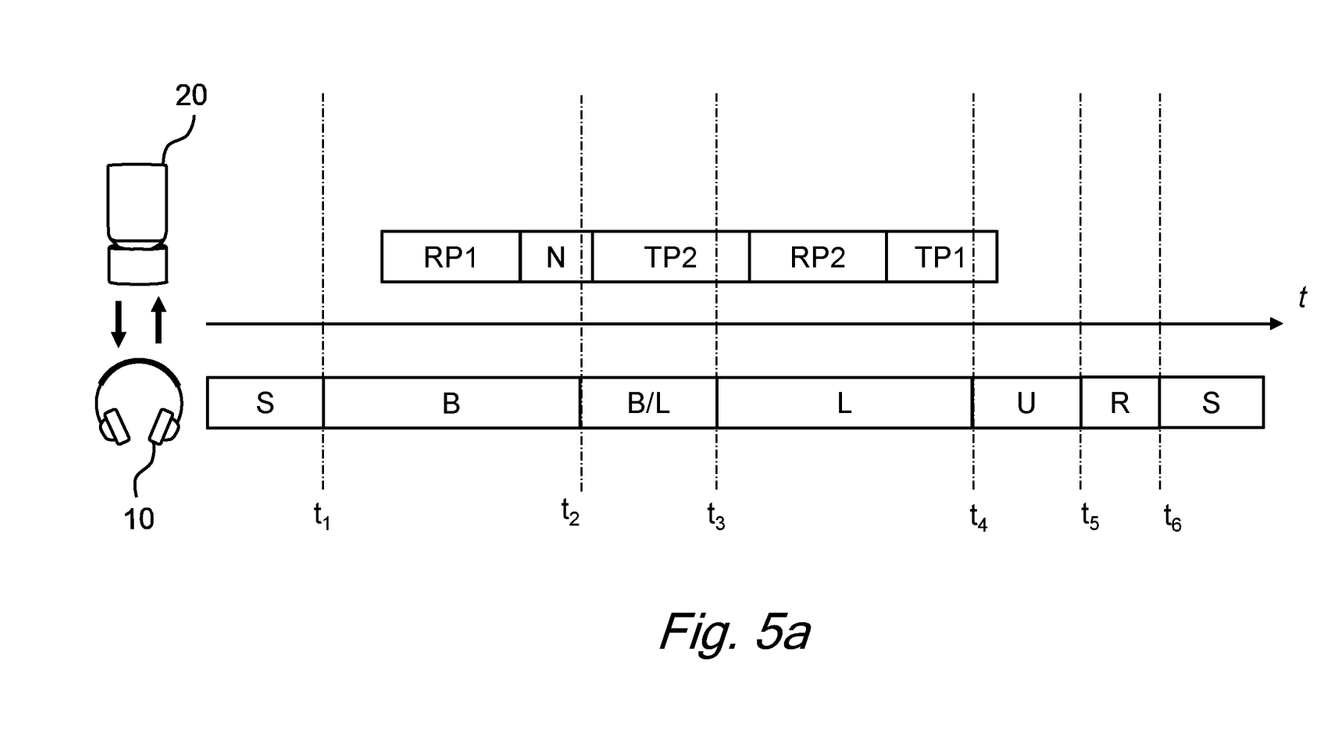
FIG. 5a is a time-schedule illustrating the operation of the wireless audio playback device and the external device during an updating procedure according to some implementations.
Figure 5B:
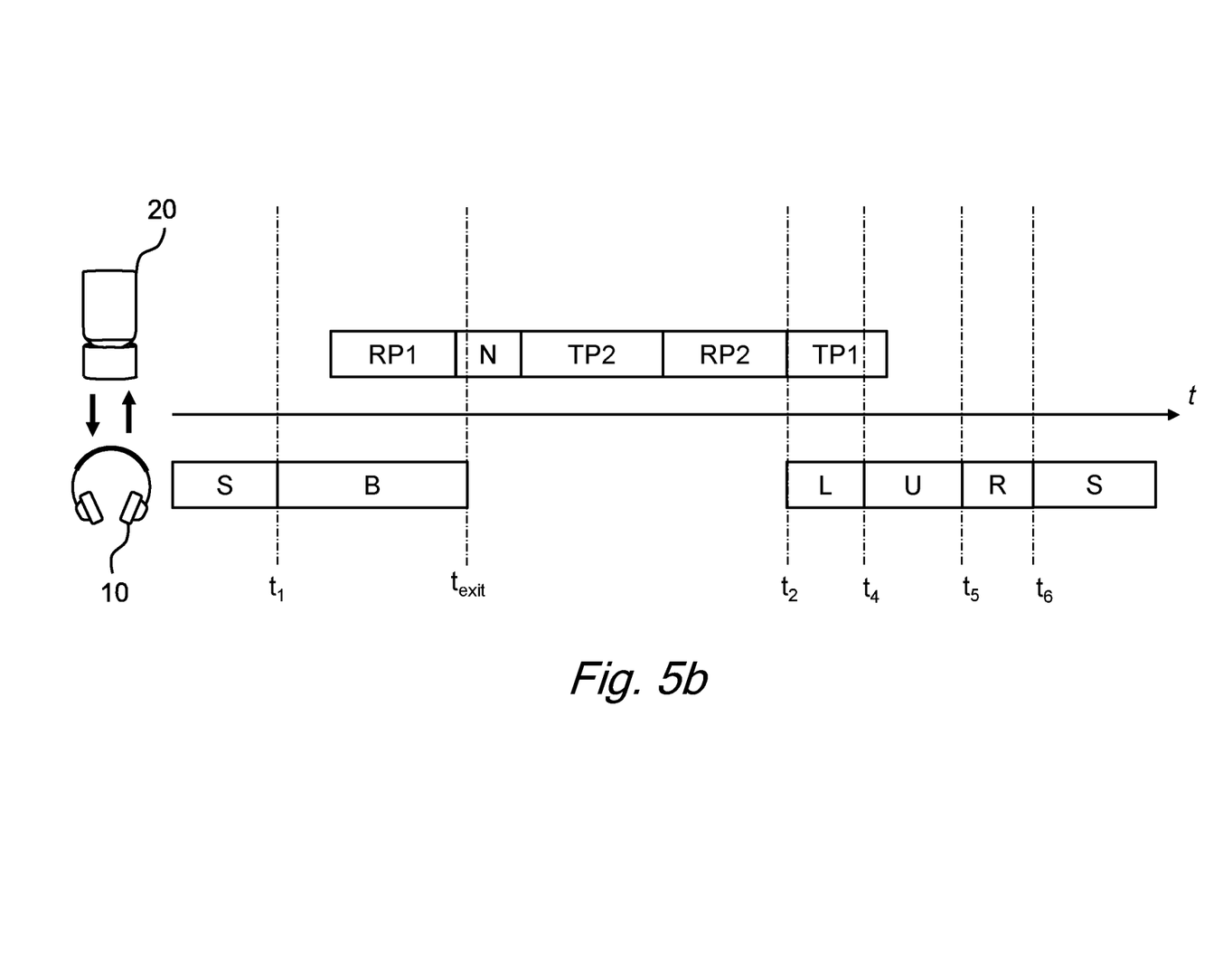
FIG. 5b is an alternative time-schedule illustrating the operation of the wireless audio playback device and the external device during an updating procedure according to some implementations.

FIG. 5a and FIG. 5b depict different time-schedules of different events occurring in the wireless audio playback device 10 and the external device 20 during an updating procedure. In FIGS. 5a and 5b events occurring in the external device 20 are depicted above the time axis and events occurring in the wireless audio playback device 10 are depicted below the time axis.

With reference to FIG. 5a and FIG. 3, the wireless audio playback device 10 is at time $t<t_1$ in its sleep state S and at time $t=t_1$ the wireless audio playback device 10 enters the temporary broadcasting mode B. During the temporary broadcasting mode B the wireless audio playback device 10 transmits (broadcasts) firmware version information over the first communication protocol P1 and the external device 20 receives the firmware version information of the wireless audio playback device 10 during RP1.

Following RP1 the external device 20 enters a negotiation phase N with at least one additional external device 20. The negotiation phase N will be described in more detail in connection to FIG. 6 in the below.

At $t=t_2$ the wireless audio playback device 10 enters the temporary listening mode L and between $t=t_2$ and $t=t_3$ the wireless audio playback device 10 is in a temporary broadcasting and listening mode B/L. At $t=t_3$ the wireless audio playback device 10 exits only the temporary broadcasting mode B and remains in the temporary listening mode L to await update data (or a notice of no available update) from the external device 20. Meanwhile, the external device 20 has transmitted the firmware update information to the remote device 30 using the second communication protocol P2 during TP2 and received update data (or a notice of no available update) from the remote device 30 using the second communication protocol P2 during RP2.

When the wireless audio playback device 10 is in the temporary listening mode between $t=t_2$ and $t=t_4$ the external device 20 starts transmitting the firmware update data (or a notice of no available update) to the wireless audio playback device 10 using the first communication protocol P1 during TP1 whereby at $t=t_4$ the wireless audio playback device 10 starts the process U of updating the firmware.

It is noted that the transmission of the update data during TP1 from the external device 20 to the wireless audio playback device 10 may continue beyond $t=t_4$. While some firmware updates require that the complete firmware update data is available locally on the wireless audio playback device 10 some updates are performed with the aid of an active communication with the external device 20. For instance, the external device 20 transmits the firmware update data to the wireless audio playback device 10 in portions wherein the wireless audio playback device 10 performs a partial firmware update with each portion of firmware data. In another example, the external device 20 may assist the wireless audio playback device 10 in performing the firmware update by extracting firmware update instructions or otherwise processing at least a portion of the firmware update data and transmitting the extracted instructions or processed firmware update data to the wireless audio playback device 10.

To this end, some implementations involve the wireless audio playback device 10 remaining in the temporary listening and/or temporary broadcasting mode during at least a part of the process U of updating the firmware to transmit and/or receive data from the external device 20. For instance, the wireless audio playback device 10 may transmit a notice to the external device 20 when a first part of the firmware update has been completed to indicate that update data associated with a next part of the firmware update process U is required. Alternatively, the complete firmware update data is available locally on the wireless audio playback device 10 whereby the updating process U may involve inactivating the transceiver 14 of the wireless audio playback device 10 to conserve power.

Between $t=t_5$ and $t=t_6$ the wireless audio playback device 10 performs a reboot procedure R and at $t=t_6$ the wireless audio playback device 10 reenters the sleep state S with the new firmware version installed.

With reference to FIG. 5b and FIG. 3 an alternative time-schedule is depicted to illustrate the predetermined intermediate time period. The start of the temporary listening mode L may deliberately be delayed (with respect to the timing-schedule of FIG. 5a) to a point in time after the wireless audio playback device 10 has exited the temporary broadcasting mode B. As seen in FIG. 5b the wireless audio playback device 10 enters the temporary broadcasting mode B at $t=t_1$ and exits the temporary broadcasting mode B at $t=t_{exit}$ wherein $t_{exit}$ occurs sometime before the wireless audio playback device 10 enters the temporary listening mode L at $t_2$. That is, a predetermined intermediate time period is defined between $t_{exit}$ and $t_2$ which may correspond to an expected time required for the external device 20 to revert with either update data or a notice. During this predetermined intermediate time period the wireless audio playback device 10 may revert to the sleep state S to conserve power. Similar to the timing-schedule of FIG. 5a, in the timing-schedule of FIG. 5b the wireless audio playback device 10 continues by starting the update process U at $t=t_4$, rebooting at $t=t_5$ and reverting to the sleep state at $t=t_6$.

Optionally, the external device 20 transmits a notice of acknowledgement during RP1 which is received by the wireless audio playback device 10 during RP1 and, in response to receiving the notice of acknowledgement, the wireless audio playback device may reenter the sleep state S immediately until time $t_2$, or the (expected) start of TP1. As the optional negotiation N and the interaction with the remote device 30 during TP2 and RP2 will take some time for the external device 20, the wireless audio playback device 10 may enter the sleep state S until a time when the external device 20 is expected to be ready to transmit firmware update data to conserve power. To receive a notice of acknowledgement, the wireless audio playback device 10 may be controlled to automatically enter a temporary broadcasting and listening mode B/L already at $t=t_1$.

It is further noted that any operation of the wireless audio playback device 10 and the external device 20 (and the remote device 30), such as the operations described in relation to FIGS. 5a and 5b in the above may be aborted or at least postponed by the user starting to use the wireless audio playback device 10. That is, even if the update procedure has been initiated the user may still use the wireless audio playback device 10 when desired.

Figure 6:
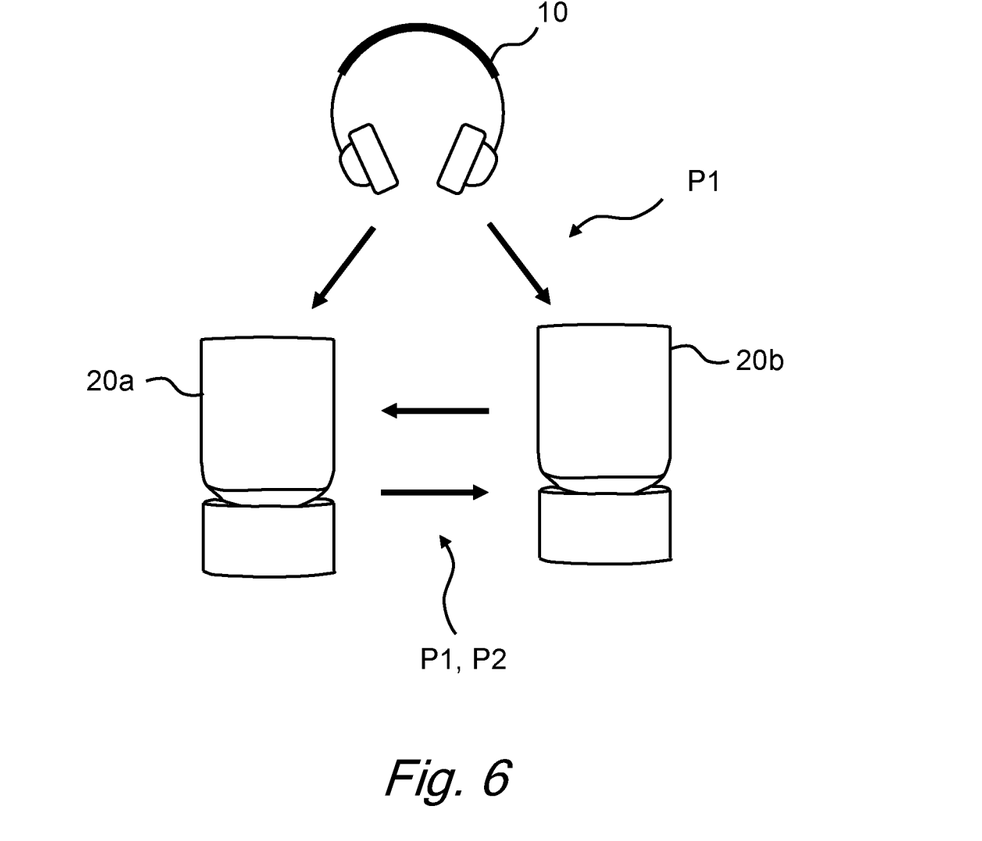
FIG. 6 is a block diagram illustrating the negotiation process between at least two external devices.

With further reference to FIG. 6 the communication during the negotiation phase N is depicted wherein the wireless audio playback device 10 conveys firmware version information to at least two external devices 20a, 20b such as a first external device 20a and at least one additional external device 20b. In some implementations, the wireless audio playback device 10 is within communication range of more than one external device 20a, 20b capable of receiving the firmware version information. For instance, there may be at least two wireless speakers within communication range of the wireless audio playback device 10 wherein the wireless speakers act as external devices 20a, 20b.

When the external devices 20a, 20b have received the firmware update information from the wireless audio playback device 10 during RP1, the first external device 20a and at least one additional external device initiate a negotiation process N using the first communication protocol P1 and/or the second communication protocol P2. During the negotiation phase N it is determined which one out of the at least two external devices 20a, 20b shall continue the update procedure and e.g. convey the firmware version information to the remote device 30.

During the negotiation process N an update cost is determined for each of the at least two external devices 20a, 20b. The update cost is given by a function with at least one variable based on a device property of the external device 20a, 20b and/or a communication property of the external device 20a, 20b.

The device property may be at least one property chosen from a group consisting of: the type of power source for the external device 20a, 20b (e.g. battery powered or powered by an external power source), the charge level of the battery, the processing power of the external device 20a, 20b, the available amount of data storage in the external device 20a, 20b, the second communication protocol P2 used by the external device and whether the external device 20a, 20b is capable of performing the updating procedure while being used for other tasks (such as playback of audio).

The communication property may be at least one property chosen from a group consisting of: a signal strength indicator for communication with the wireless audio playback device 10 and a signal strength indicator for communication with the remote device 30.

The update cost indicates the cost in terms of energy consumption and/or estimated time required to perform the update procedure. For instance, an external device 20a, 20b powered by a battery, with a low signal strength for communication with the wireless audio playback device 10 and which must abort its current audio playback to perform the update will be associated with a higher update cost in comparison with an external device 20a, 20b which is powered by external power, has a high signal strength for communication with the wireless audio playback device 10 and which is capable of performing the update procedure in the background while performing other functions (such as playback of audio).

During the negotiation procedure each external device 20a, 20b determines its update cost and transmits the update cost (using the first or second communication protocol P1, P2) to an external device 20a, 20b which performs the comparison of the update costs to determine which external device 20a, 20b is associated with the lowest update cost and shall continue the updating procedure. Alternatively, each external device transmits its device properties and/or communication properties to an external device which calculates the update cost and performs the comparison of the update costs to determine which external device 20a, 20b is associated with the lowest update cost and shall continue the updating procedure.

When the external device 20a, 20b which is associated with the lowest update cost has been determined, the determined external device 20a, 20b is notified and continues the updating procedure by initiating TP2 and communication with the remote device 30.

It is noted that the negotiation phase N and the communication between the first and additional external device 20a, 20b is entirely optional. For instance, without the negotiation phase N each external device 20a, 20b proceeds with the update procedure irrespective of the any other external device which also received the firmware version information from the wireless audio playback device 10, whereby the external device 20a, 20b which firsts communicates firmware update data or a notice of no available update to the wireless audio playback device 10 continues with the update procedure.

The person skilled in the art realizes that the present invention by no means is limited to the preferred embodiments described above. On the contrary, many modifications and variations are possible within the scope of the appended claims. For example, at least one of the first and additional external device 20a, 20b may transmit a notice of acknowledgement to the wireless audio playback device 10 upon receiving the firmware version information to allow the wireless audio playback device 10 to temporarily enter the sleep state until update data is expected to be available.

The invention claimed is:

1. A method for updating a firmware of a wireless audio playback device, wherein the wireless audio playback device comprises a wireless transceiver configured to communicate using a first communication protocol, wherein said wireless audio playback device is at least one of wireless headphones, wireless earphones, and a wireless speaker, and wherein the wireless audio playback device is operable in a sleep state in which said wireless transceiver is inactive by default, said method comprising:
controlling said wireless audio playback device to enter said sleep state;

controlling said wireless audio playback device to, in said sleep state, automatically enter a temporary broadcasting mode in which at least a transmitter of said wireless transceiver is activated;

conveying, with said wireless audio playback device in the temporary broadcasting mode, firmware version information to a wireless speaker using the first communication protocol, the firmware version information being indicative of a firmware version of the wireless audio playback device;

controlling said wireless audio playback device to automatically enter a temporary listening mode in which at least a receiver of said wireless transceiver is activated;

transmitting, by the wireless speaker, the firmware version information to a remote device over a second communication protocol different from said first communication protocol;

receiving, by the wireless speaker, update data from the remote device over said second communication protocol, wherein the remote device has determined the update data based on the firmware version information and wherein the update data comprises instructions for updating the firmware of the wireless audio playback device;

transmitting, by the wireless speaker, the update data over the first communication protocol;

receiving, by the wireless audio playback device in the temporary listening mode, the update data over the first communication protocol; and updating the firmware of the wireless audio playback device using the update data.

2. The method according to claim 1, wherein said first communication protocol is a Bluetooth communication protocol.

3. The method according to claim 1, wherein said second communication protocol is a Wi-Fi communication protocol or a wired communication protocol.

4. The method according to claim 1, wherein controlling said wireless audio playback device to automatically enter the temporary broadcasting mode and temporary listening mode comprises controlling said wireless audio playback device to periodically enter the temporary broadcasting mode and temporary listening mode.

5. The method according to claim 1, further comprising controlling said wireless audio playback device to automatically exit the temporary broadcasting mode and temporary listening mode and return to the sleep state after a predetermined elapsed time since the wireless audio playback device entered the temporary broadcasting mode or since the wireless audio playback device entered the temporary listening mode.

6. The method according to claim 1, wherein controlling said wireless audio playback device to automatically enter the temporary broadcasting mode comprises controlling said wireless audio playback device to automatically enter the temporary broadcasting mode at a predetermined time of day.

7. The method according to claim 6, wherein the predetermined time of day is between 12:00 am and 6:00 am or preferably between 2:00 am and 4:00 am.

8. The method according to claim 7, wherein the predetermined time of day is between 2:00 am and 4:00 am.

9. The method according to claim 1, wherein said wireless audio playback device is further operable in an operation state in which said wireless transceiver is active by default, the method further comprising:

receiving, by said wireless audio playback device in the operation state, audio content transmitted by a user device; and rendering said audio content to at least one loudspeaker element of said wireless audio playback device in the operation state.

10. The method according to claim 1, wherein:

controlling said wireless audio playback device to enter the temporary broadcasting mode comprises controlling said wireless audio playback device to enter the temporary broadcasting mode at a first point in time, t1;

controlling said wireless audio playback device to enter the temporary listening mode comprises controlling said wireless audio playback device to enter the temporary listening mode at a second point in time, t2; and t2 is greater than or equal to t1.

11. The method according to claim 10, wherein:

the method further comprises controlling said wireless audio playback device to automatically exit the temporary broadcasting mode at a third point in time, texit; and t1<texit<t2 such that texit and t2 are separated with a predetermined intermediate time period.

12. The method according to claim 11, further comprising controlling said wireless audio playback device to automatically reenter the sleep state during the predetermined intermediate time period.

13. A computer program product comprising instructions which, when the program is executed by a computer of an updating system, cause the computer to carry out the method according claim 1.

14. The method according to claim 1, wherein said wireless speaker is a first wireless speaker and wherein the method further comprises:

conveying, with said wireless audio playback device in the temporary broadcasting mode, firmware version information to at least one additional wireless speaker using the first communication protocol; and determining that the first wireless speaker is associated with a lower update cost value than the at least one additional wireless speaker;

wherein the update cost value of each wireless speaker is based on a device property of the wireless speaker or the communication properties of the wireless speaker.

15. A method for updating a firmware of a wireless audio playback device, wherein the wireless audio playback device comprises a wireless transceiver configured to communicate using a first communication protocol, wherein said wireless audio playback device is operable in a sleep state in which said wireless transceiver is inactive by default, said method comprising:

controlling said wireless audio playback device to enter said sleep state;

controlling said wireless audio playback device to, in said sleep state, automatically enter a temporary broadcasting mode in which at least a transmitter of said wireless transceiver is activated;

conveying, with said wireless audio playback device in the temporary broadcasting mode, firmware version information to an external device using the first communication protocol, the firmware version information being indicative of a firmware version of the wireless audio playback device;

controlling said wireless audio playback device to automatically enter a temporary listening mode in which at least a receiver of said wireless transceiver is activated;

transmitting, by the external device, the firmware version information to a remote device over a second communication protocol different from said first communication protocol;
receiving, by the external device, update data from the remote device over said second communication protocol, wherein the remote device has determined the update data based on the firmware version information and wherein the update data comprises instructions for updating the firmware of the wireless audio playback device;
transmitting, by the external device, the update data over the first communication protocol;
receiving, by the wireless audio playback device in the temporary listening mode, the update data over the first communication protocol; and
updating the firmware of the wireless audio playback device using the update data;
wherein said external device is a first external device and wherein the method further comprises:
conveying, with said wireless audio playback device in the temporary broadcasting mode, firmware version information to at least one additional external device using the first communication protocol; and
determining that the first external device is associated with a lower update cost value than the at least one additional external device;
wherein the update cost value of each external device is based on the device properties of the external device or the communication properties of the external device.

16. An updating system comprising:
a wireless audio playback device being at least one of wireless headphones, wireless earphones, and a wireless speaker, wherein the wireless audio playback device comprises a wireless transceiver configured to communicate using a first communication protocol, wherein said wireless audio playback device is operable in a sleep state in which said wireless transceiver is inactive by default; and
a wireless speaker configured to communicate with the wireless audio playback device using a first communication protocol and with a remote device using a different second communication protocol;
wherein said wireless audio playback device further comprises an audio device controller, configured to:
control said wireless audio playback device to enter said sleep state;
control said wireless audio playback device to, in said sleep state, automatically enter a temporary broadcasting mode in which at least a transmitter of said wireless transceiver is activated;
control said wireless audio playback device to, in the temporary broadcasting mode, convey firmware version information to the wireless speaker with said transmitter using the first communication protocol, the firmware version information being indicative of a firmware version of the wireless audio playback device;
control said wireless audio playback device to automatically enter a temporary listening mode in which at least a receiver of said wireless transceiver is activated;
wherein said wireless speaker further comprises a wireless speaker controller configured to:
control said wireless speaker to transmit the firmware version information to a remote device over the second communication protocol;
control said wireless speaker to receive update data from the remote device over the second communication protocol, wherein the remote device has determined the update data based on the firmware version information and wherein the update data comprises instructions for updating the firmware of the wireless audio playback device; and
control said wireless speaker to transmit the update data to the wireless audio playback device;
wherein the audio device controller is further configured to:
control the wireless audio playback device to, in the temporary listening mode, receive the update data over the first communication protocol; and
update the firmware of the wireless audio playback device using the update data.

* * * * *